Feb. 19, 1963 E. J. H. BUSSARD 3,078,420

AUTOMATIC FERRITE LOOP ANTENNA LOADING

Filed Sept. 5, 1958 2 Sheets-Sheet 1

INVENTOR.
EMMERY J. H. BUSSARD.
BY Alden D. Redfield
Irwin P. Garfinkle
ATTORNEYS

AUTOMATIC FERRITE LOOP ANTENNA LOADING

Filed Sept. 5, 1958 2 Sheets-Sheet 2

INVENTOR.
EMMERY J. H. BUSSARD.
BY Alden D. Redfield
Irwin P. Garfinkle
ATTORNEYS.

United States Patent Office 3,078,420

Patented Feb. 19, 1963

3,078,420

AUTOMATIC FERRITE LOOP ANTENNA LOADING

Emmery J. H. Bussard, Cincinnati, Ohio, assignor to Avco Manufacturing Corporation, Cincinnati, Ohio, a corporation of Delaware Filed Sept. 5, 1958, Ser. No. 759,267
8 Claims. (Cl. 330—29)

This invention relates to a system and apparatus for compensating for the unloading of a transformer resulting from the application of gain control, and particularly for compensating the unloading of high frequency ferrite cored transformers employed as couplers to transistor mixers and amplifiers.

As is well known in the art, the input impedance of a transistor which is gain-controlled by a negative-going voltage varies over a wide range with automatic gain control drive. In many applications the transistor may be driven essentially to cutoff bias under normal operating conditions for the desired control range. Input impedance changes greater than 10 to 1 may be obtained with normal automatic gain control of a transistorized mixer, and even greater impedance changes have been observed in gain-controlled transistorized amplifier stages.

The change in transistor input impedance resulting from gain control is reflected into the driving transformer, thereby changing its load such that the bandwidth and transfer characteristics are seriously altered. This is especially true with high Q devices, such as ferrite cored antenna loops and ferrite cored intermediate frequency transformers. The unloading due to gain control drive in antennae and intermediate frequency transformers can result in a frequency shift and a circuit bandwidth reduction to the extent that the transformer becomes the controlling element in the selectivity of the amplifier. On the other hand, good receiver operation requires that the center frequency remain substantially constant while the bandwidth should increase with increased signal strength for better audio fidelity.

It is also known that the characteristics of certain magnetic materials can be altered by superimposing an electric field on the material to alter the degree of saturation; furthermore, it has been observed that with certain magnetic materials, such as ferrites, the Q factor is effected much more than the permeability factor (mu) as the saturation of the core is increased. I use this peculiar characteristic to provide an automatically controlled circuit Q with increased signal input to the antenna without serious circuit detuning. In fact, the detuning which results from core saturation is used to compensate for the opposite detuning caused by the increased transistor input impedance. In addition, I automatically increase the bandwidth of the tuned circuits, thus improving fidelity. Careful, though not critical, adjustment results in stable transformer operation with variation of signal input level over a wide operating range.

Thus, by means of this invention I compensate for impedance change in the transistor input circuit resulting from increased automatic gain control by providing an auxiliary compensating voltage for altering the state or degree of saturation of the antenna or intermediate frequency transformer core.

The principal object of this invention is to provide automatic compensation for impedance change due to variable loading of a magnetic cored transformer resulting from changes in level of the automatic gain control.

Another object of this invention is the provision of automatic means for band-pass increase with increased signal strength to provide improved high frequency audio response.

Another object of this invention is to provide means for automatic gain control of signal intensity to the input transistor.

One illustrated embodiment of my invention is employed in conjunction with an antenna provided with an elongated ferrite core and having its output connected across the input of a transistor mixer supplied with a source of negative-going automatic gain control. To compensate for changes in the antenna loading due to the variation in level of the automatic gain control, I provide means for changing the degree of saturation of the ferrite core in accordance with the varying automatic gain control current. I thereby compensate for changes in frequency, Q and inductance, and produce stable operation of the system.

A second embodiment illustrates the operation of my invention in conjunction with a gain-controlled intermediate frequency amplifier driven by the output of a magnetic cored intermediate frequency transformer. As in the first embodiment, the degree of saturation of the transformer is automatically adjusted in accordance with the level of the automatic gain control applied to the transistor input, thereby compensating for changes in frequency, Q and inductance.

Another embodiment of my invention employs a gain-controlled transistor connected to the input of a ferrite cored antenna and thus accelerates the degree of core saturation and compensates for the change in antenna impedance.

Another embodiment of my invention employs a ferrite cored antenna which is self-loaded to control impedance rise and automatically provide partial gain control.

For a more complete understanding of the nature and further objects of my invention, reference should now be made to the following detailed description and to the accompanying drawings, in which.

Figures 3, 4, 5:
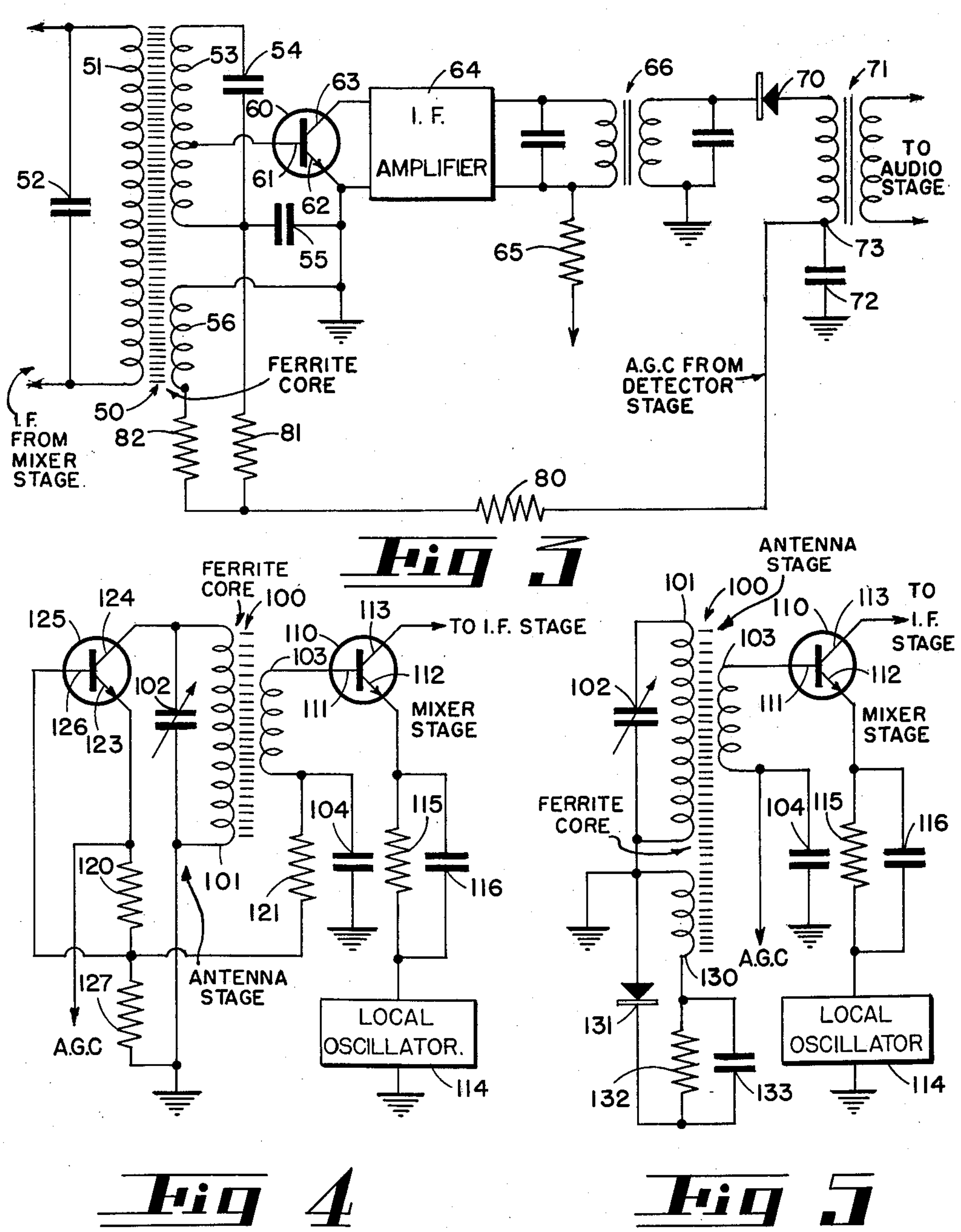
FIG. 3 illustrates an embodiment of my invention used in conjunction with a ferrite cored intermediate frequency transformer.

FIG. 4 is another embodiment of my invention illustrating the use of a ferrite cored antenna, the impedance of which is compensated by the application of gain control power to a transistor connected in the input of the antenna; and FIG. 5 illustrates still another embodiment of my invention in which self-saturating circuitry controls the impedance of a ferrite cored antenna and automatically provides partial gain control.

Figure 1:
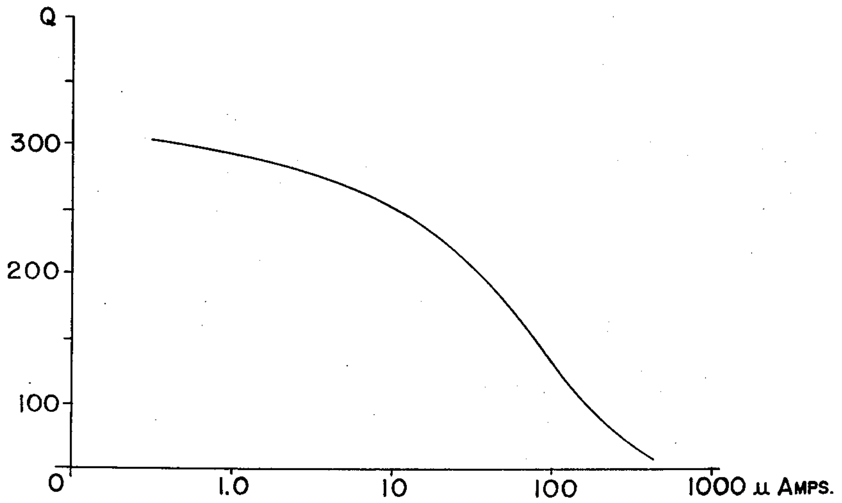
FIG. 1 is a curve illustrating the Q vs. direct current field characteristics of a ferrite cored antenna winding.

The coil Q vs. direct current field characteristics of a ferrite loop antenna, such as is commonly used in radio broadcast receivers, is illustrated in FIG. 1 on a semi-logarithmic scale. In the specific example depicted the loop antenna had an unloaded Q of about 450 at the frequency of measurement. To obtain a plot, the antenna loop was fixed loaded to reduce the Q to about 300. As is known, the operating Q should be relatively high for pickup of weak signals. From FIG. 1 it may be observed that a current of 10 microamps flowing through the antenna loop drops the Q to about 50% and that a current in the order of 300 microamps drops the Q of the coil to about 20% of its loaded value. It was also observed that the tuning change in the range of from 10 to 300 microamps was less than .1%. Since the drop in Q value represents a decrease in effective capture area of the loop, it may serve as a gain control while tending to maintain the correct load impedance.

Figure 2:
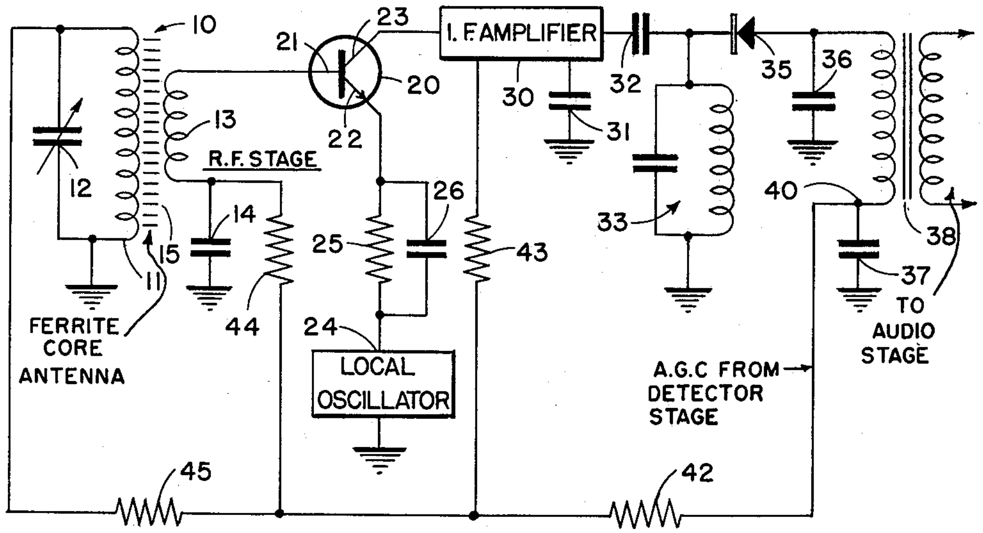
FIG. 2 illustrates an embodiment of my invention used in conjunction with a ferrite cored antenna.

Referring to FIG. 2, there is schematically shown a portion of superheterodyne receiver having antenna and mixer stages incorporating my invention, and conventional intermediate frequency and detector stages. The antenna stage includes an antenna 10 having a ground primary pickup winding 11 tuned by a variable condenser 12 and an aperiodic secondary winding 13 grounded for alternating cuurents by a condenser 14. Both the primary winding 11 and the secondary winding 13 are wound on an elongated magnetic core 15, preferably made of a ferrite material for relatively high Q's. The antenna loop is provided with a relatively high turns ratio to provide a very large impedance step down, e.g., the impedance of the primary winding 11 may be on the order of 350K ohms and the secondary winding 13 about 1500 ohms for coupling to a mixer having a low impedance input.

Signals picked up by the antenna 10 are passed from the secondary winding 13 to the base input circuit of a transistorized mixer 20 having a base 21, an emitter 22 and a collector 23. Intermediate frequency signals are obtained in a conventional manner by means of the heterodyning action of a local oscillator 24, the output of which is applied to the emitter 22 through the emitter-resistor load 25 and a parallel-connected condenser 26.

The signals derived from the collector 23 of the mixer 20 are amplified in an intermediate frequency amplifier 30, grounded for alternating currents by a condenser 31. The amplified signals are then coupled by means of condenser 32 across a tuned circuit 33 to a diode detector 35. High frequency signals are bypassed to ground by means of direct current blocking condensers 36 and 37, and audio signals are applied to audio amplifiers (not shown) through a transformer 38. The junction 40 at the audio transformer 38 provides a D.-C. source of grain control power available for use in the novel manner taught by my invention.

I apply automatic gain control power to the intermediate frequency stage from the junction 40 through resistors 42 and 43. I also apply automatic gain control power from the junction 40 to the input of the mixer stage transistor 20 through resistors 42 and 44, and through the low impedance secondary winding 13 of antenna 10. To compensate for the resulting change in the input impedance of the mixer stage transistor 20 due to this application of gain control power, I apply to the high impedance primary winding 11 of antenna 10 a core-saturating current from the gain control power source 40 through resistors 42 and 45.

In operation, as gain control power is applied to the base 21, the input impedance of transistor 20 is altered over a wide range and the resulting change in impedance is reflected back from the secondary winding 13 to the primary winding 11 of transformer 10. This action reduces the load on the transformer 10 so that both the bandwidth and transfer characteristics of the transformer are seriously altered. With a high Q ferrite cored antenna, such as is illustrated in FIG. 1, the unloading of the transformer results in a circuit bandwidth reduction and a shift in resonant frequency to an extent that it may become the controlling element in the selectivity of the receiver. In some receivers of this type without compensation, signals are actually lost and regained periodically to produce a flutter operation on strong input signals.

By applying current from the junction 40 through resistors 42 and 45 to the primary winding 11 of transformer 10, I alter the characteristics of the ferrite rod by increasing the direct current bias flux on the rod and thus increase the level of saturation of the core. This results in a reduction in circuit Q, tending to compensate for the change in impedance and re-establish the receiver bandwith automatically. Because the saturating current applied to the transformer affects the Q to a much greater degree than the permeability, the resonant frequency of the transformer is substantially stabilized. Also, the decrease in Q effectively produces a stage of automatic gain control ahead of the first transistor stage, since the capture area of the antenna is reduced.

Reference is now made to FIG. 3 in which my invention is illustrated in conjunction with a gain-controlled intermediate frequency amplifier stage. Intermediate frequency signals derived from a mixer stage (not shown) are applied in the usual way to an intermediate frequency transformer 50, having a primary winding 51 fixed-tuned by a condenser 52, and a secondary winding 53 fixed-tuned by a condenser 54 and grounded for alternating currents by a condenser 55. The transformer 50 also includes an auxiliary winding 56, the connections and operations of which will be described in detail below.

The output from transformer 50 may be derived from a small, low impedance, tapped-down portion of secondary winding 53 and applied to the base input circuit of a transistorized intermediate frequency amplifier 60 having a base 61, a grounded emitter 62 and a collector 63. Depending upon the gain requirements of the system, the amplifier 60 may be followed by any number of intermediate frequency amplifier stages indicated generally in block 64, and provided with operating bias from a source (not shown) through a resistor 65. The output of the intermediate frequency amplifiers is then applied through a conventional tuned transformer 66 to a detector 70.

Audio signals may then be passed through an audio transformer 71, the primary of which is grounded for intermediate frequency signals by means of a D.-C. blocking condenser 72. The junction 73 constitutes a conventional source of direct current automatic gain control power.

For applying the automatic gain control power to the intermediate frequency amplifier 60 I provide a direct current path to the transistor base 61 from the junction 73 through resistors 80 and 81 and the small tapped-down portion of winding 53. Since the application of gain control power to the base 61 increases the input impedance of the transistor 60 and, hence, unloads the intermediate frequency transformer 50, the Q and bandwidth characteristics of the intermediate frequency transformer are seriously altered and the transformer is detuned and the bandwidth is narrowed.

In order to compensate for detuning, to increase the bandwidth, and to avoid attendant loss of power in the amplifier stages, I also apply gain control power from the junction 73 to the saturating winding 56 through the resistors 80 and 82. As in the embodiment illustrated in FIG. 2, this has the effect of compensating for the unloading due to gain control applied to the transistor input. While I have illustrated a separate additional saturating winding 56 in this embodiment, it is to be clearly understood that similar advantageous results will also be achieved under many circumstances by eliminating the winding 56 and connecting the resistor 82 directly to the primary winding 51, provided the direct current bias for the preceeding driver stage (not shown) does not flow through the winding 51. Also, this same control may be applied to as many of the intermediate frequency stages as may be required.

In the embodiment of FIG. 4 I employ a ferrite cored antenna transformer 100 having a high impedance primary winding 101 tuned by variable condenser 102, and a low impedance, aperiodic secondary winding 103 grounded for radio frequencies by a D.-C. blocking condenser 104. Signals picked up at the antenna transformer 100 are applied to the input circuit of a transistorized mixer 110 having a base 111, an emitter 112, and a collector 113. As in conventional superheterodyne receivers, the radio frequency signals are converted into intermediate frequency signals as a result of the heterodyning action of a local oscillator 114, the output of which is applied to the emitter 112 through a parallel-connected resistor 115 and a condenser 116. The collector output from the mixer 110 may then be amplified and detected in a conventional manner.

I apply any convenient source of automatic gain control power through resistors 120 and 121 and the low impedance secondary winding 103 to the base 111 of transistor mixer 110. Since (as in the previous embodiments) the impedance variations in the transistor mixer 110 are reflected back to the transformer 100, thereby causing a change in circuit characteristics, I also apply current to the primary winding 101 of the transformer 100 in a manner to compensate for impedance changes. In this embodiment current is applied through the emitter 123 and the collector 124 of an auxiliary saturation-controlling transistor 125. Base-emitter bias for the transistor 125 is provided by connecting the base 126 and the emitter 123 across the resistor 120, and the emitter circuit is completed to ground through a resistor 127. Thus, transistor 125 is driven by the received signal, and its level of operation is controlled by the automatic gain control. This arrangement takes advantage of the amplification of the transistor 125, thus permitting faster control, and it may even be used to over-compensate. Moreover, this arrangement provides a stage of gain control ahead of the mixer stage and alone may suffice in many applications to provide adequate gain control performance.

The embodiment illustrated in FIG. 5 is identical with that of FIG. 4, with the exception that saturating currents for the transformer core are obtained without the benefit of transistor 125; instead, an additional saturated winding 130 is wound on the magnetic core and connected in series with a rectifier 131 and parallel-connected resistor 132 and condenser 133. Radio frequency signals picked up at the antenna transformer 100 are also applied to the saturating winding 130 and converted to direct current by the rectifier 131. Since only direct current flows through the saturating winding 130 and since the magnitude of the direct current through the winding 130 is proportional to the magnitude of the radio frequency signals, the degree of direct current saturation of the ferrite core of the transformer 100 will vary in proportion to the strength of the received signals. In the operation of this embodiment, increased radio frequency signals received at the antenna 100 will cause an attendant increase in automatic gain control power applied to the base input circuit of mixer 110. As in the other embodiments, this results in an unloading of the antenna. The current flowing through the saturating winding 130 compensates for this unloading in two ways; first, the direct currents produced by the rectifier 131 tend to reduce the antenna Q, thereby providing partial gain control ahead of both the antenna and the mixer stages and, in addition, the reduction in Q tends to compensate for the change in impedance resulting in the mixer stage.

While in each of the illustrated embodiments my invention is described in conjunction with a transistorized receiver, the invention is equally applicable to other types of equipment and is also useful in conjunction with other types of semiconductors. In fact, the invention may even be useful under certain conditions with vacuum tubes. Also, if more automatic gain control power is required in special cases than can reasonably be obtained from the circuitry illustrated in FIGS. 2 and 3, then a direct current amplifier may be used after the detector. It is my intention, therefore, that my invention be limited only by the scope of the following claims as interpreted in the light of the prior art.

I claim:

1. The combination comprising: a high Q transformer tuned to a predetermined resonant frequency and having a predetermined bandwidth, said transformer having a high impedance input winding and a relatively low impedance output winding both wound on a saturable magnetic core; a variable impedance device having a low impedance input circuit connected across said low impedance output winding; a source of direct current power for varying the input impedance of said variable impedance device in accordance with a varying condition; and means controlled by said source of direct current power for adjusting the degree of saturation of said core for compensating for variations of impedance of said input circuit, thereby maintaining substantially constant said predetermined resonant frequency and tending to increase said bandwidth with increased power from said source.

2. The invention as defined in claim 1 wherein said core is comprised of a ferrite material.

3. The invention as defined in claim 1 wherein said variable impedance device comprises an electronic valve having an input electrode, an output electrode and an electrode common to said input and said output electrodes, said low impedance output winding being connected across said input electrode and said common electrode, and wherein said source of direct current power comprises a source of automatic gain control connected to said input electrode.

4. The invention as defined in claim 3 wherein said electronic valve comprises a transistor and wherein said input, output and common electrodes comprise, respectively, a base, a collector and an emitter electrode.

5. The invention as defined in claim 1 wherein said means adjusting the degree of saturation of said core comprises an auxiliary winding mounted on said core and connected to said source.

6. The invention as defined in claim 1 wherein said means adjusting the saturation of said core comprises an auxiliary winding on said core and a rectifier connected in a series loop with said auxiliary winding.

7. The invention as defined in claim 1 wherein said means adjusting the saturation of said core comprises an auxiliary transistor having base, emitter and collector electrodes, said emitter and collector electrodes being connected in a series loop with said primary winding and said source.

8. In a radio receiver for processing radio frequency signals, the combination comprising: a first transistor amplifier for amplifying said radio frequency signals, said first transistor having base, emitter, and collector electrodes; an input circuit between said base and emitter electrodes; a transformer having a primary winding and a secondary winding both wound on a saturable magnetic core; means connecting said secondary winding across said input circuit of said first transistor; a second transistor having base, emitter, and collector electrodes, the collector and emitter electrodes of said second transistor being connected in series with said primary winding and first and second resistors; a source of automatic gain control voltage connected across said first and second resistors, said automatic gain control voltage being a direct voltage proportional to the magnitude of said signal; a connection from the base of said first transistor to the junction of said first and second resistors for controlling the gain of said first transistor in inverse relationship to the magnitude of said signal; and a connection from the base of said second transistor to said junction for controlling the conductivity of said second transistor in inverse relationship to the magnitude of said signal whereby the current flow in said series loop including said first and second resistors, the emitter and collector electrodes of said second transistor and said primary winding is controlled by said source and whereby the degree of saturation of said magnetic core is varied as the gain of said first transistor is controlled.

References Cited in the file of this patent

UNITED STATES PATENTS

| | | |
|---|---|---|
| 2,714,187 | Goodrich | July 26, 1955 |
| 2,750,452 | Goodrich | June 12, 1956 |
| 2,773,945 | Theriault | Dec. 11, 1956 |
| 2,774,866 | Burger | Dec. 18, 1956 |
| 2,853,602 | Farber | Sept. 23, 1958 |
| 2,878,380 | Holmes | Mar. 17, 1959 |
| 2,891,146 | Sciwba | June 16, 1959 |
| 2,897,353 | Schweiss | July 28, 1959 |